UNITED STATES PATENT OFFICE.

HENRI GOUTHIERE, OF PARIS, FRANCE, ASSIGNOR TO GUSTAV EDWARD JUNIUS, OF LONDON, ENGLAND.

PROCESS OF PURIFYING SUGAR-JUICES.

SPECIFICATION forming part of Letters Patent No. 704,027, dated July 8, 1902.

Application filed May 7, 1901. Serial No. 59,079. (No specimens.)

*To all whom it may concern:*

Be it known that I, HENRI GOUTHIERE, a citizen of the Republic of France, and a resident of Paris, France, have invented certain new and useful Improvements in Processes of Purifying Sugar, of which the following is a specification.

This process is based upon the action of ferric fluorid $(Fe_2Fl_6)$ on sugar syrup in presence of small quantities of lime, (CaO.) The principal reactions which have to be considered will be stated in the following sections:

First. The ferric fluorid $(Fe_2Fl_6)$ added to the syrup in the shape of a concentrated solution is decomposed under the influences of the dilution and of the heat, and thus hydrofluoric acid (HFl) and oxy-fluorids of a more or less insoluble character and variable composition are formed. These two substances precipitate certain albuminoid matters contained in the syrup, and, further, the hydrofluoric acid (HFl) neutralizes by its antiseptic properties the action of certain fermenting substances which are always contained in the syrup.

Second. When milk of lime is added to the syrup, prepared as above, a precipitate of insoluble hydrated ferric oxid $(Fe2O_3 3H_2O)$ and fluorid of calcium $(CaFl_2)$ is produced. These two substances, which are formed in a nascent state in the syrup, complete the purification commenced and described in section 1 by precipitating albuminoid and other foreign substances. The syrup decants easily, and the filtering is rapid. This is not the case with the simple defecation by lime, for, besides the slight purification which it effects, it produces a voluminous and gelatinous precipitate, and the filtering of the syrup is thus rendered more difficult; but when ferric fluorid $(Fe_2Fl_6)$ is used the ferric oxid $(Fe_2O_3)$ and the clacium fluorid $(CaFl_2)$ effect not only a good purification, but give at the same time a totally-different precipitate, which can easily be separated by filtering.

Third. The clear syrup after having been purified by ferric fluorid, as described in sections 1 and 2, always contains some traces of iron, (Fe,) which cannot be removed by alkalies. In order to eliminate this metal completely, it is precipitated as phosphate of iron $(F_2PO_4)$ by phosphoric acid $(H_3PO_4)$ or by the acid phosphates of alkaline earths.

Having described the general principles of my process, I may now state the manner in which the process is used with the raw juice of beet-root. A concentrated solution of ferric fluorid $(Fe_2Fl_6)$ is added to the diffusion-juice which has a temperature of 40° centigrade maximum. This operation may be performed in the existing carbonation apparatus provided with mechanical stirrers. A precipitation of albuminoid substances and other foreign bodies takes place, and this precipitation is completed by adding a small quantity of milk of lime and by heating to 70° to 80° centigrade. The decomposition of the ferric fluorid $(Fe_2Fl_6)$ is thus completed, and insoluble calcium fluorid $(CaFl_2)$ and hydrate of ferric oxid $(Fe_2O_3 3H_2O)$ are formed. These two compounds, produced in the nascent state, form, with the albuminoid and other substances, a precipitate which is easily removed, leaving the syrup perfectly clear. This syrup may be filtered by the ordinary filter-presses which are used for the carbonation processes. To the filtered clear syrup, which is of alkaline reaction, is then added an acid phosphate of alkaline earths or ordinary phosphoric acid, $(H_3PO_4.)$ Thus a precipitate of phosphate of iron, $(PO_4)2Fe_2$ and phosphate of calcium, $(PO_4)2Ca_3$, is formed. This syrup is then heated to 80° to 90° centigrade and filtered by filter-presses, and the filtering may be completed by mechanical filters. The clear filtered syrup is now evaporated and treated in the ordinary manner. By these operations a purification of a higher type is obtained than that resulting from the double and treble carbonation process which is generally employed in beet-sugar works. The quantity of lime which is required is insignificant, 0.3 to 0.4 kilograms for one hundred kilograms of beet-root are sufficient as against 2.5 to 3.5 kilograms used in the processes which are employed at present. By not using the carbonation process a considerable part of the apparatus which is required for this operation is suppressed. The quantity of foam resulting from the purification by my process is much less considerable than that resulting from the carbonation process, and consequently the loss of sugar in the sediment is considerably diminished.

Since only a small quantity of lime is employed by me, the transformation of a part of the albuminoid substance is avoided. This transformation takes place with the double and treble carbonation processes, where a great excess of lime is used at a rather high temperature, causing the generation of ammoniacal vapors, which escape, and amides, which form soluble organic non-sugar, and thus interfere with crystallization.

Having thus described the nature of my process, I claim as my invention—

1. The process of purifying sugar-juice, which consists in treating it with ferric fluorid, substantially as described.

2. The process of purifying sugar-juice, which consists in treating it with ferric fluorid in the shape of a concentrated solution, substantially as described.

3. The process of purifying sugar-juice which consists in treating it with ferric fluorid and adding milk of lime.

4. The process of purifying sugar-juice which consists in treating it with a concentrated solution of ferric fluorid and adding milk of lime whereby calcium fluorid and hydrated ferric oxid are produced in a nascent state and act to purify and clarify the juice, substantially as described.

5. The process of purifying sugar-juice which consists in treating it with ferric fluorid, in adding milk of lime, and in then precipitating the iron as a phosphate, substantially as described.

In testimony whereof I have signed my name to this specification in the presence of two subscribing witnesses.

HENRI GOUTHIERE.

Witnesses:
PAUL RICHARD FRIEDRICH,
EDWARD P. MACLEAN.